(12) United States Patent
Annamraju et al.

(10) Patent No.: US 11,595,461 B2
(45) Date of Patent: Feb. 28, 2023

(54) MONITORING NETWORK CONDITIONS

(71) Applicant: Imagination Technologies Limited, Kings Langley (GB)

(72) Inventors: Venu Annamraju, Hyderabad (IN); Kiran Kumar Ravuri, Hyderabad (IN); Mallikarjuna Kamarthi, Hyderabad (IN)

(73) Assignee: Imagination Technologies Limited, Kings Langley (GB)

( * ) Notice: Subject to any disclaimer, the term of this patent is extended or adjusted under 35 U.S.C. 154(b) by 523 days.

(21) Appl. No.: 15/749,369

(22) PCT Filed: Jun. 29, 2016

(86) PCT No.: PCT/GB2016/051953
§ 371 (c)(1),
(2) Date: Jan. 31, 2018

(87) PCT Pub. No.: WO2017/021682
PCT Pub. Date: Feb. 9, 2017

(65) Prior Publication Data
US 2018/0227349 A1 Aug. 9, 2018

(30) Foreign Application Priority Data

Jul. 31, 2015 (GB) ..................................... 1513522

(51) Int. Cl.
*G06F 15/173* (2006.01)
*H04L 65/80* (2022.01)
(Continued)

(52) U.S. Cl.
CPC ............ *H04L 65/80* (2013.01); *H04L 43/087* (2013.01); *H04L 43/0858* (2013.01);
(Continued)

(58) Field of Classification Search
CPC ....... H04L 12/26; H04L 29/06; H04L 12/841; H04L 12/801; H04L 12/861; H04N 21/2401
See application file for complete search history.

(56) References Cited

U.S. PATENT DOCUMENTS 6,360,271 B1 * 3/2002 Schuster ............... H04J 3/0632
370/516
6,442,139 B1 8/2002 Hosein
(Continued)

FOREIGN PATENT DOCUMENTS

CN 1638321 A 7/2005
CN 102209078 A 10/2011
(Continued)

OTHER PUBLICATIONS

Chinese Search Report dated Dec. 13, 2019 in Chinese Application No. 2016106083295.
(Continued)

*Primary Examiner* — John B Walsh
(74) *Attorney, Agent, or Firm* — Potomac Law Group, PLLC; Vincent M DeLuca

(57) ABSTRACT

A method of identifying a network condition between a pair of network devices, wherein one of the devices comprises a jitter buffer for storing packets received via a network, the method comprising: monitoring a measure of delay in receiving media packets over the network; monitoring a size of the jitter buffer; and identifying a network condition in dependence on a change in the measure of delay and a variation in the size of the jitter buffer.

18 Claims, 7 Drawing Sheets

(51) Int. Cl.
*H04L 43/0852* (2022.01)
*H04L 43/087* (2022.01)
*H04L 43/106* (2022.01)
*H04L 65/612* (2022.01)
*H04L 43/16* (2022.01)
*H04L 41/5025* (2022.01)
*H04L 41/50* (2022.01)

(52) U.S. Cl.
CPC ............ *H04L 43/106* (2013.01); *H04L 43/16* (2013.01); *H04L 65/612* (2022.05); *H04L 41/509* (2013.01); *H04L 41/5025* (2013.01)

(56) References Cited

U.S. PATENT DOCUMENTS

| | | |
|---|---|---|
| 6,862,298 B1 | 3/2005 | Smith et al. |
| 7,742,413 B1 * | 6/2010 | Bugenhagen ......... H04L 43/026 370/231 |
| 8,868,731 B1 | 10/2014 | Tsai et al. |
| 9,094,307 B1 | 7/2015 | Edsall et al. |
| 2002/0007429 A1 | 1/2002 | Boulandet |
| 2006/0233203 A1 | 10/2006 | Iwamura |
| 2006/0277051 A1 | 12/2006 | Barriac et al. |
| 2007/0121597 A1 | 5/2007 | Lee et al. |
| 2008/0172441 A1 * | 7/2008 | Speicher ............. H04L 12/2838 709/201 |
| 2010/0110892 A1 | 5/2010 | Lai et al. |
| 2011/0075582 A1 | 3/2011 | Sugiyama et al. |
| 2012/0163191 A1 | 6/2012 | Tokimizu et al. |
| 2012/0281572 A1 | 11/2012 | Lundin et al. |
| 2013/0100970 A1 * | 4/2013 | Vafin ................ H04N 21/44004 370/517 |
| 2013/0117842 A1 | 5/2013 | Kakadia et al. |
| 2014/0153431 A1 | 6/2014 | Lundin et al. |
| 2014/0334484 A1 * | 11/2014 | Klimker ................ H04L 65/605 370/352 |
| 2015/0092585 A1 | 4/2015 | Shao et al. |
| 2016/0171990 A1 * | 6/2016 | Reuschl .................. G10L 21/04 704/503 |
| 2016/0330108 A1 * | 11/2016 | Gillon .................... H04L 69/40 |

FOREIGN PATENT DOCUMENTS

| | | |
|---|---|---|
| EP | 1345446 A1 | 9/2003 |
| EP | 1434378 A2 | 6/2004 |
| EP | 1619840 B1 | 12/2008 |
| GB | 2519835 A | 5/2015 |
| JP | 2002314595 A | 10/2002 |
| KR | 20000044522 A | 7/2000 |
| KR | 10-2010-0133776 A | 12/2010 |
| WO | 97/22201 A2 | 6/1997 |
| WO | 00/55829 A1 | 9/2000 |
| WO | 2004/092891 A2 | 10/2004 |
| WO | 2004/092981 A2 | 10/2004 |
| WO | 2014207978 A1 | 12/2014 |

OTHER PUBLICATIONS

Extended European Search Report dated Dec. 9, 2019 in European Application No. 19205209.0.

Unknown edited by Cui Duwu "Practical Technology of Network Multimedia" (People's Posts and Telecommunications Press, published on Dec. 31, 2000); 27 pages.

* cited by examiner

MONITORING NETWORK CONDITIONS

BACKGROUND OF THE INVENTION

This invention relates to a method and device for identifying network conditions.

Real-time streaming of multimedia content over the internet has become an increasingly common application in recent years. A wide range of multimedia applications, such as on-demand TV, live TV viewing, audio streaming, video conferencing, net meetings, video telephony, voice over internet protocol (VoIP) and many others rely on end-to-end streaming solutions. Unlike a "downloaded" media file, which may be retrieved first in "non-real" time and played back later, streaming media applications require a media source to encode and to transmit a media signal over a network to a media receiver, which must decode and playback the media signal in real time.

Problems can arise when streaming media across a network, such as the Internet. For example, the network link between a pair of network end-points may become congested, which can lead to a deterioration in the quality of service of that link. The effects of network congestion includes queueing delay, packet loss and blocking of new connections. This, in turn, can lead to a degradation in the quality and timeliness of the media being played out at the receiving end-point.

One of the causes of network congestion is buffer-bloat. Network elements usually employ buffers to accommodate bursty incoming traffic. These buffers begin to be filled or bloated whenever incoming bandwidth exceeds outgoing bandwidth. This can cause packets to become queued in those buffers for a significant period of time, especially in network elements that have large buffers. In a first-in first-out queuing system, overly large buffers of network elements result in longer queues and higher latency which causes the network to be congested.

When streaming real-time media, for example, it may be desirable for the device transmitting the media stream to quickly adapt its transmission parameters in response to changes in the network so that real-time playback can be maintained at the receiving device. For example, when the network becomes congested, the transmitting device may reduce the transmission bandwidth of the media stream by reducing the quality of the media so that the media stream does not congest the network further and so that it takes less time for packets to reach the receiving device over the congested network. In order to quickly and appropriately adapt the transmission properties of the media stream in response to changeable network conditions, there is a need to be able to detect changes in the condition of the network and to determine the cause of those changes.

SUMMARY OF THE INVENTION

According to a first aspect there is provided a method of identifying a network condition between a pair of network devices, wherein one of the devices comprises a jitter buffer for storing packets received via a network, the method comprising: monitoring a measure of delay in receiving media packets over the network; monitoring a size of the jitter buffer; and identifying a network condition in dependence on a change in the measure of delay and a variation in the size of the jitter buffer.

The identifying step may comprise identifying congestion in the network if the change in the measure of delay indicates an increase in network delay and the size of the jitter buffer decreases below a threshold size.

The identifying step may comprise identifying a change in a network route between the pair of network devices in dependence on a variation in the size of the jitter buffer about a threshold size.

The identifying step may comprise identifying an increase in network delay if the change in the measure of delay indicates an increase in network delay and the size of the jitter buffer temporarily decreases below a threshold size.

The step of monitoring a measure of delay may comprise: determining a first time period between receiving a first-received packet for an initial media frame and receiving a first-received packet for a subsequent media frame, wherein each received packet comprises a timestamp; determining a second time period between the timestamp of the packet for the initial media frame and the timestamp of the packet for the subsequent media frame; and forming the measure of delay in dependence on the difference between the first and second time periods.

The step of monitoring a measure of delay may comprise: determining a first time period between receiving an initial media frame and receiving a subsequent media frame, wherein each received frame comprises a timestamp; determining a second time period between the timestamp of the initial media frame and the timestamp of the subsequent media frame; and forming the measure of delay in dependence on the difference between the first and second time periods.

The method may further comprise: adjusting the measure of delay in dependence on the size of the jitter buffer; at a first one of the network devices, sending an indication of said adjusted measure to the other network device; and at said other network device, receiving said indication and adjusting a bandwidth for transmission of media to said first network device in dependence on said indication.

The method may further comprise: at a first one of the network devices, sending an indication of said identified network condition to the other network device; and at said other network device, receiving said indication and adjusting a bandwidth for transmission of media to said first network device in dependence on said indication.

The method may further comprise: at a first one of the network devices, sending an indication of the measure of network delay and the size of the jitter buffer to the other network device; and at said other network device, receiving said indication and adjusting a bandwidth for transmission of media to said first network device in dependence on said indication.

The packets may be RTP packets. The measure of delay may be determined in dependence on RTP timestamps.

According to a second aspect there is provided a data processing device for receiving a stream of media packets via a network, the device comprising: a transceiver configured to receive media packets from another device via the network; a jitter buffer configured to store the received packets; and a controller configured to: monitor a measure of delay in receiving the media packets over the network; monitor a size of the jitter buffer; and identify a network condition in dependence on a change in the measure of delay and a variation in the size of the jitter buffer.

The controller may be further configured to identify congestion in the network if the change in the measure of delay indicates an increase in network delay and the size of the jitter buffer decreases below a threshold size.

The controller may be further configured to identify a change in a network route between the data processing device and said another device in dependence on a variation in the size of the jitter buffer about a threshold size.

The controller may be further configured to identify an increase in network delay if the change in the measure of delay indicates an increase in network delay and the size of the jitter buffer temporarily decreases below a threshold size.

The controller may be further configured to: determine a first time period between receiving a first-received packet for an initial media frame and receiving a first-received packet for a subsequent media frame, wherein each received packet comprises a timestamp; determine a second time period between the timestamp of the packet for the initial media frame and the timestamp of the packet for the subsequent media frame; and form the measure of delay in dependence on the difference between the first and second time periods.

The controller may be further configured to: determine a first time period between receiving an initial media frame and receiving a subsequent media frame, wherein each received frame comprises a timestamp; determine a second time period between the timestamp of the initial media frame and the timestamp of the subsequent media frame; and form the measure of delay in dependence on the difference between the first and second time periods.

The packets may be RTP packets. The timestamps may be RTP timestamps.

The controller may be further configured to adjust the measure of delay in dependence on the size of the jitter buffer; and the transceiver is further configured to send an indication of said adjusted measure to said another device.

The transceiver may be configured to send an indication of said identified network condition to said another device.

The transceiver may be configured to send an indication of the measure of network delay and the size of the jitter buffer to said another device.

According to a third aspect there is provided a system comprising: a data processing device as described above; said another device; and the network, wherein said another device is configured to receive the indication and adjust a bandwidth for transmission of media to the data processing device in dependence on the indication.

According to a fourth aspect there is provided machine readable code for implementing the method described above.

According to a fifth aspect there is provided a machine readable non-transitory storage medium having encoded thereon machine readable code for implementing the method described above.

DESCRIPTION OF THE DRAWINGS

The present invention will now be described by way of example with reference to the accompanying drawings. In the drawings.

DETAILED DESCRIPTION OF THE DRAWINGS

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
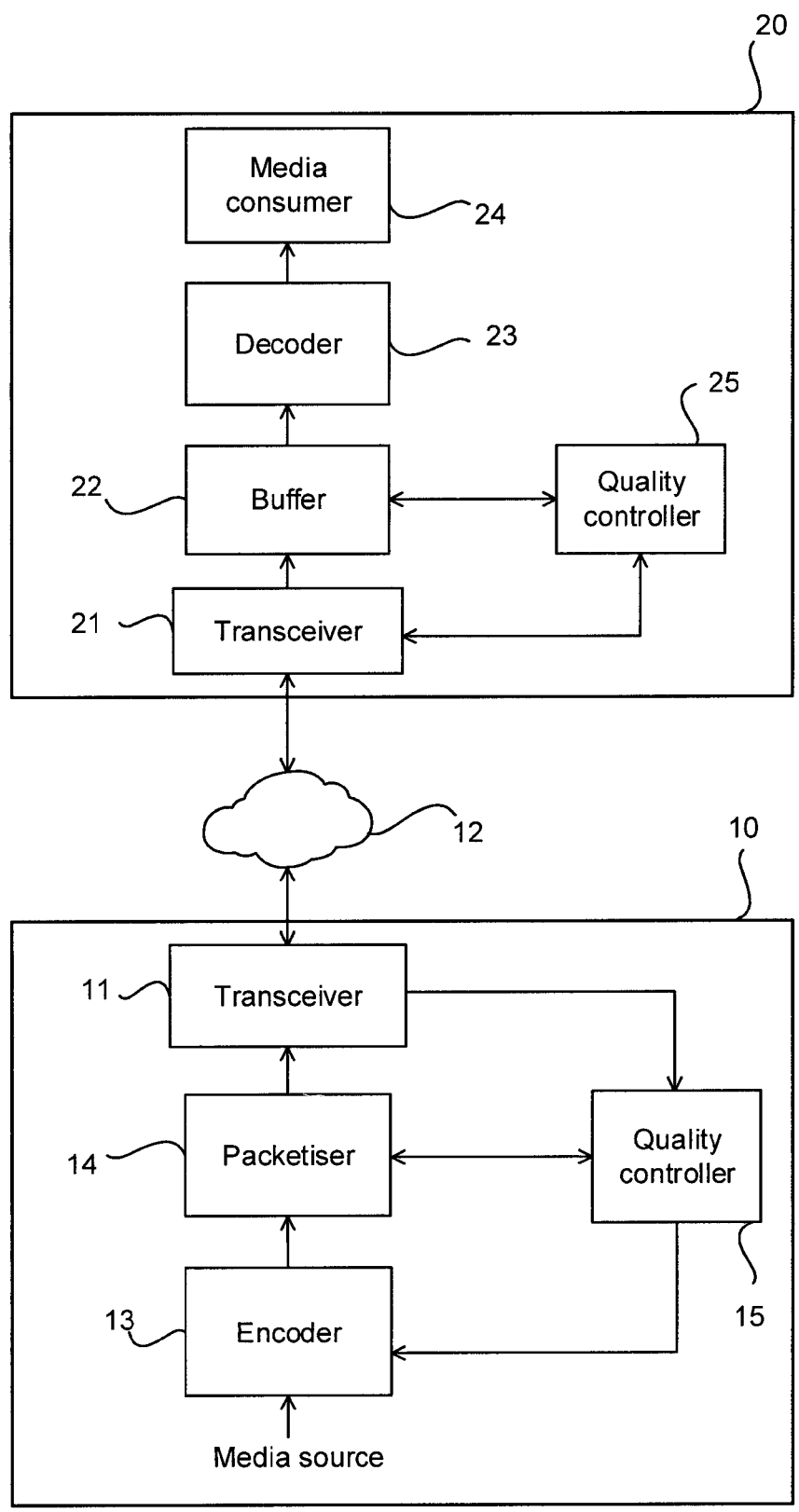
FIG. 1 shows an example of a transmitting device and a receiving device.

FIG. 1 depicts a transmitting device 10, which may be any suitable device that is capable of generating packet based data such as a computer, smartphone, videophone, etc. The transmitting device 10 comprises a transceiver 11 for connection to a communications network 12 such as the internet or other packet based networks. The transmitting device 10 can transmit and/or receive packets to and/or from the communications network 12 via the transceiver 11.

The transmitting device 10 comprises an encoder 13 for encoding media data (e.g. video and/or audio data) that is to be transmitted over the communications network 12 to a receiving device 20. The media data may be from a media source such as a camera and/or microphone, storage device, etc (not shown). The encoder 13 may encode the media data into media frames. Each frame may comprise a timestamp or sequence number which indicates the playout order of the frame and/or a time that the frame is to be played out. The timestamp may indicate the time the media from the media source was sampled (i.e. a sampling instant) according to a reference clock or wallclock that is synchronised at the transmitting and receiving devices 10 and 20. The frames may be encoded so that they are played out at a specified frame rate. The encoder 13 may encode the media data according to a coding standard such as ITU-T Recommendation H.264 or ISO/IEC International Standard 14496-10 (both also known as Advanced Video Coding (AVC)), MPEG-DASH, HTTP Live Streaming or any other suitable codec.

The transmitting device 10 comprises a packetiser 14 which receives the encoded media frames from the encoder 13 and packetises the frames into a sequence of packets for transmission over the network 12 via the transceiver 11. Each frame may be packetised into one or more packets. Each packet may indicate the timestamp for its frame, e.g., in the packet header. Packets that belong to the same media frame may comprise the same timestamp. As mentioned above, the timestamp may be derived from a reference clock or wallclock that is common between the transmitting device 10 and receiving device 20. The packetiser 14 may packetise the media in accordance with a Real-time Transport Protocol (RTP) standard. Other standardised packet formats may be used. The packetiser 14 provides the packets to the transceiver 11 for transmission over the network 12 to receiving device 20.

The receiving device 20 comprises a transceiver 21 for receiving packets from the network 12. The packets are provided to a buffer 22, which may be a jitter buffer that is capable of ordering the packets according to a playout sequence of the media data in the packets. This sequence may be indicated by a sequence number or timestamp contained in each packet. A decoder 23 decodes the packets in the order provided to it by the buffer 22 to form a media stream. The decoder 23 decodes packets according to the codec used by the encoder 13. A media consumer 24 receives the decoded media stream for playback. In the example shown in FIG. 1, the media consumer 24 may be an audio and/or video player, the data packets carrying media data may be RTP packets and the media stream may be video and/or audio stream.

As mentioned above, the condition of the network 12 may change (e.g. become congested), which may lead to a delay in receiving packets at the receiving device 20.

This delay may lead to complete frames being received too late for them to be played out on time by the media consumer 24. Thus, it is desirable to determine if the condition of the network 12 has changed and how it has changed so that the transmitting device 10 can appropriately adapt its transmission in order to compensate for the change. The transmission device 10 may comprise a quality controller 15, which is capable of adjusting the transmission properties (such as bandwidth, media quality, packet size, etc) of the media stream.

The receiving device 20 comprises a quality controller 25 for identifying changes in the network 12. The quality controller 25 is capable of determining when packets are received by the receiving device 20. The time that a packet is received may be derived from the wallclock or an internal clock (not shown), which may not necessarily be synchronised with the wallclock. The quality controller 25 is also capable of determining the time indicated by timestamp comprised in each packet. The quality controller 25 is capable of identifying changes in the condition of the network by comparing the times that packets are received with the times indicated by the timestamps of those packets, as discussed in further detail below. The quality controller 25 may send an indication of the identified change to the transmitting device 10 so that it can appropriately adjust its transmission parameters. The quality controller 25 may also adjust some of its reception parameters (e.g. target jitter buffer size) in response to some network conditions.

The quality controller 25 uses a congestion measure to identify network conditions between the transmitting and receiving devices such as congestion, route changes, etc. The congestion measure is determined using the inter-arrival times between each newly received frame and a reference frame. As mentioned above, each frame may be made up from one or more packets having the same timestamp. The inter-arrival times between frames is determined by comparing the first-received packet for each frame. Each frame has a different timestamp and so the quality controller 25 is able to determine that a packet for a new frame has arrived if the timestamp of that packet has not previously been received. The first-received packet for each frame may not necessarily be the first packet that has been packetised or transmitted by the transmitting device 10 because of packet loss, varying network paths, etc in the network 12. The first-received packet is the first packet received by the receiving device 20 for a particular frame. Thus, a complete frame is not required to be received (i.e. all of the packets required to build the complete frame) in order to compare the arrival times between frames.

The inter-arrival times of the first received packet between a newly received frame and a reference frame is compared against the difference in time between the timestamps of those frames. This comparison is used to form the congestion measure. Equation 1 is an example of how the comparison could be made:

$$\text{Congestion measure} = (\text{CurrentFrameRx} - \text{RefFrameRx}) - (\text{CurrentFrameTS} - \text{RefFrameTS}) \quad (1)$$

Where CurrentFrameRx is the time when the first packet is received for the current frame, RefFrameRX is the time when the first packet is received for the reference frame, CurrentFrameTS is the timestamp for the current frame and RefFrameTS is the timestamp in the reference frame. As mentioned above, the timestamp for a frame may be comprised in each packet for that frame. Alternatively, the timestamp may be determined from building a complete frame by receiving all of the packets necessary for building that frame.

Equation 2 is an example of how the congestion measure can be determined in a system which uses RTP packets to send media data:

$$\text{Congestion measure} = (\text{CurrentFrameRx} - \text{RefFrameRx}) - [(\text{CurrentFrameTS} - \text{RefFrameTS})/90] \quad (2)$$

Where CurrentFrameRx is the time in milliseconds when the first RTP packet is received for the current frame, RefFrameRX is the time milliseconds when the first RTP packet is received for the reference frame, CurrentFrameTS is the timestamp comprised in the RTP header of the first RTP packet for the current frame and RefFrameTS is the timestamp comprised in the RTP header of the first RTP packet for the reference frame. Dividing by 90 converts the RTP time units into milliseconds.

If the congestion measure is zero or within some threshold that is close to zero, then it is considered that packets received from the network are "on-time" and so the network is operating satisfactorily for the purposes of the media stream. The reference frame is considered to be a frame that has arrived on-time according to the best available knowledge. Initially, the first frame of the media stream is chosen to be the reference frame. Subsequently, the reference frame is updated whenever a frame arrives on-time or within some threshold.

As mentioned above, the time when the first-received packet for a frame is used to determine when a frame has arrived rather than when all of the packets to complete the frame has arrived. This provides a congestion measure that is insensitive to variations in packet loss, out-of-order packets, retransmission of packets and packet sizes.

FIGS. 2a-2d illustrate various scenarios which show how the congestion measure can be used to determine the condition of a network.

Figure 2A:
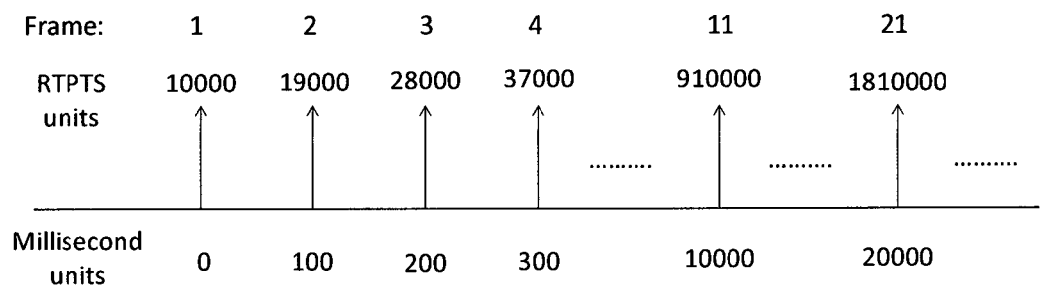
FIGS. 2a-2d illustrate packet reception timings under various network conditions.

FIG. 2a illustrates a scenario where the network is operating under normal conditions. Each arrow represents a media frame sent using the RTP protocol. The RTP time stamp (RTPTS) for that frame is indicated above the arrows. The time when then the first packet for each of the frames is received is indicated by the time below the arrows (in milliseconds). This time is shown as a time relative to the first frame, but could also be an absolute time. In this case the first frame is selected to be the reference frame. Using equation 2 for RTP packets, the congestion measure for each frame is calculated as follows:

1st frame:

Congestion measure=(0−0)−((10000−10000)/90)=0

2nd frame:

Congestion measure=(100−0)−((19000−10000)/90)= (100−100)=0

3rd frame:

Congestion measure=(200−0)−((28000−10000)/90)= (200−200)=0

4th frame:

Congestion measure=(300−0)−((37000−10000)/90)= (300−300)=0

11th frame:

Congestion measure=(10000−0)−((910000−10000)/ 90)=(10000−10000)=0

21st frame:

Congestion measure=(20000−0)−((1810000−10000)/ 90)=(20000−20000)=0

In this scenario, the congestion measure is a constant value of zero from the 1st frame to the 21st frame. This indicates that the frames are reaching the receiving device 20 on-time and so the network is operating satisfactorily for the purposes of the media stream.

Figure 2B:
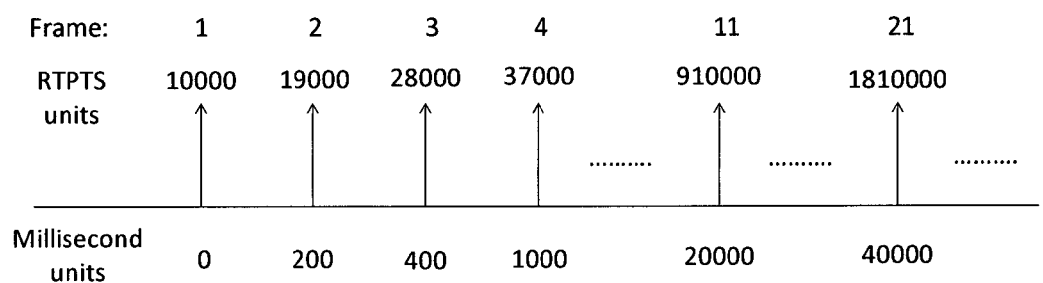

FIG. 2b illustrates a scenario where there is congestion in the network. Using equation 2, the congestion measure for each frame is calculated as follows:

1st frame:

Congestion measure=(0−0)−((10000−10000)/90)=0

2nd frame:

Congestion measure=(200−0)−((19000−10000)/90)= (200−100)=100

3rd frame:

Congestion measure=(400−0)−((28000−10000)/90)= (400−200)=200

4th frame:

Congestion measure=(1000−0)−((37000−10000)/90)= (1000−300)=700

11th frame:

Congestion measure=(20000−0)−((910000−10000)/ 90)=(20000−10000)=10000

21st frame:

Congestion measure=(40000−0)−((1810000−10000)/ 90)=(40000−20000)=20000

This scenario differs from the FIG. 2a scenario as the first-received packet for the $2^{nd}$ to 21st frames are being received in an increasingly delayed manner. During congestion, the congestion measure, over time, is proportional to the mismatch between the sending bitrate and the bandwidth of the network. At other times, the congestion measure is close to zero or below some threshold indicating no congestion.

The manner in which the congestion measure increases depends on the sending bandwidth, choke bandwidth (or throttling) and network usage. It is possible to infer where the cause of the congestion may lie between devices 10 and 20. For example, a first set of congestion measure values may be determined at device 20 for packets sent from device 10 and a second set of congestion measure values may be determined at device 10 for packets sent from device 20. Devices 10 and 20 may share their determined congestion measure values with each other. It may be determined from those shared values that the path from device 10 to device 20 is congested whilst the path from device 20 to device 10 is operating satisfactorily. From this it is possible to infer that the congestion may be caused by the sending bandwidth at device 10 rather than due to a reduction in the available bandwidth of network 12 because the congestion is only seen in one direction rather than both directions through the network 12. Similarly, if it is determined that both paths are congested then it is possible to infer that there is a problem with the network 12 (such as a reduction in the available bandwidth).

Figure 2C:
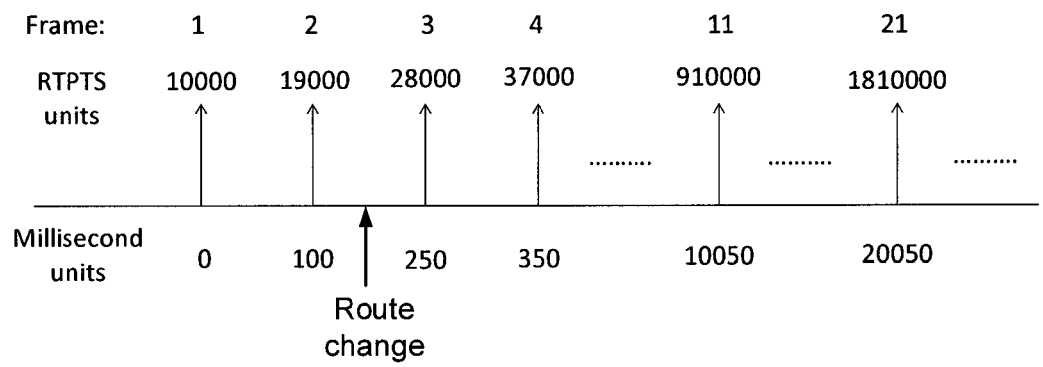

FIG. 2c illustrates a scenario where there is a single increase in network delay, which occurs between the second and third frame (as indicated in the figure). Using equation 2, the congestion measure for each frame is calculated as follows:

1st frame:

Congestion measure=(0−0)−((10000−10000)/90)=0

2nd frame:

Congestion measure=(100−0)−((19000−10000)/90)= (100−100)=0

3rd frame:

Congestion measure=(250−0)−((28000−10000)/90)= (250−200)=50

4th frame:

Congestion measure=(350−0)−((37000−10000)/90)= (350−300)=50

11th frame:

Congestion measure=(10050−0)−((910000−10000)/ 90)=(10050−10000)=50

21st frame:

Congestion measure=(20050−0)−((1810000−10000)/ 90)=(20050−20000)=50

In this scenario the congestion measure increases for the third frame and remains at that increased value for the subsequent frames. As the delay is constant (rather than increasing, as is the case for FIG. 2b), this indicates that the delay is not due to congestion. This increase in delay indicates, for example, that there has been a change in the network path (as depicted by the route change arrow in FIG. 2c) which leads to a longer amount of time for packets to be transported from the transmitting device 10 to the receiving device 20. Preferably, when this scenario is determined by the quality controller 25, the constant value (50, in this example), is subtracted from the calculation of the congestion measure until the reference frame has been updated.

Figure 2D:
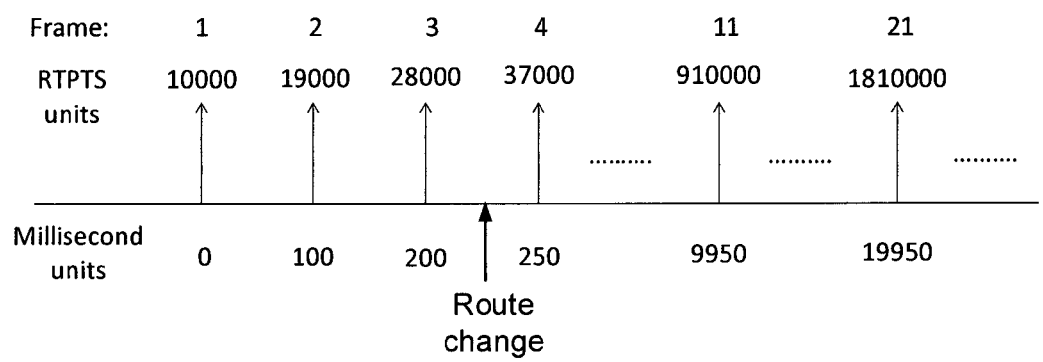

FIG. 2d illustrates a scenario where there is a single decrease in network delay, which occurs between the third and fourth frames, as indicated in the figure. Using equation 2, the congestion measure for each frame is calculated as follows:

1st frame:

Congestion measure=(0−0)−((10000−10000)/90)=0

2nd frame:

Congestion measure=(100−0)−((19000−10000)/90)= (100−100)=0

3rd frame:

Congestion measure=(200−0)−((28000−10000)/90)= (200−200)=0

4th frame:

Congestion measure=(250−0)−((37000−10000)/90)= (250−300)=−50

Update the reference frame, RefFrame=FourthFrame

11th frame:

Congestion measure=(9950−250)−((910000−37000)/ 90)=(9700−9700)=0

21st frame:

Congestion measure=(19950−250)−((1810000− 37000)/90)=(19700−19700)=

In this scenario the congestion measure decreases for the fourth frame. The decrease indicates, for example, that there has been a change in the network path (as depicted by the route change arrow in FIG. 2d) which leads to a shorter amount of time for packets to be transported from the transmitting device to the receiving device. In this case, the fourth frame is considered to be received on-time and so the reference frame is updated from the first frame to the fourth frame for calculating the congestion measure for subsequent frames.

Preferably (in addition to the FIG. 2d scenario), the reference frame is updated occasionally or periodically since clock skew between the sender and receiver may lead to a gradual change in the congestion measure value. It is advantageous to update the reference frame at least once after initialisation, since it may not be known whether the first frame is "on-time" or experiencing congestion.

The quality controller 25 may monitor the congestion measure to determine the condition of the network, as described by the scenarios above. The quality controller 25 may then transmit information indicative of the condition of the network to the transmitting device 10. Alternatively or additionally, the quality controller 25 may send the congestion measure and/or the CurrentFrameRx and RefFrameRx values and/or the CurrentFrameTS and RefFrameTS values to the transmitting device 10 so that quality controller 15 can similarly determine the condition of the network 12. The transmitting device 10 may then adjust its media transmission in dependence on the received information. For example, if it is determined that the network is congested, the quality controller 15 may, in response, cause the transmitting device 10 to reduce its transmission bandwidth. This may be achieved by, for example, reducing the quality of the media that is to be transmitted, increasing packet size (which reduces the packetisation overhead), reducing error correction redundancy, etc. Preferably, the transmission bandwidth will be reduced to be lower than the congested network bandwidth so that further congestion can be avoided. This will ensure that transmitted media packets arrive at the receiving device in a timely manner for playback.

The quality controller 15 or 25 may determine the condition of the network based on two or more values of the congestion measure exceeding a threshold. For example, a threshold value for congestion may be provided and if, e.g., three consecutively determined congestion measure values exceed this threshold, then it may be determined that the network is congested. This prevents any spurious or spiked values from falsely classifying the network as congested. Additionally or alternatively, an average of two or more congestion measure values may be used for determining the network condition rather than a single value. For example, the last three congestion measure values may be averaged to determine a current congestion measure value. Preferably, the number of congestion measure values used in either case is not excessive such that it causes a delay in responding to the detection of a network condition in a timely manner.

Figure 3:
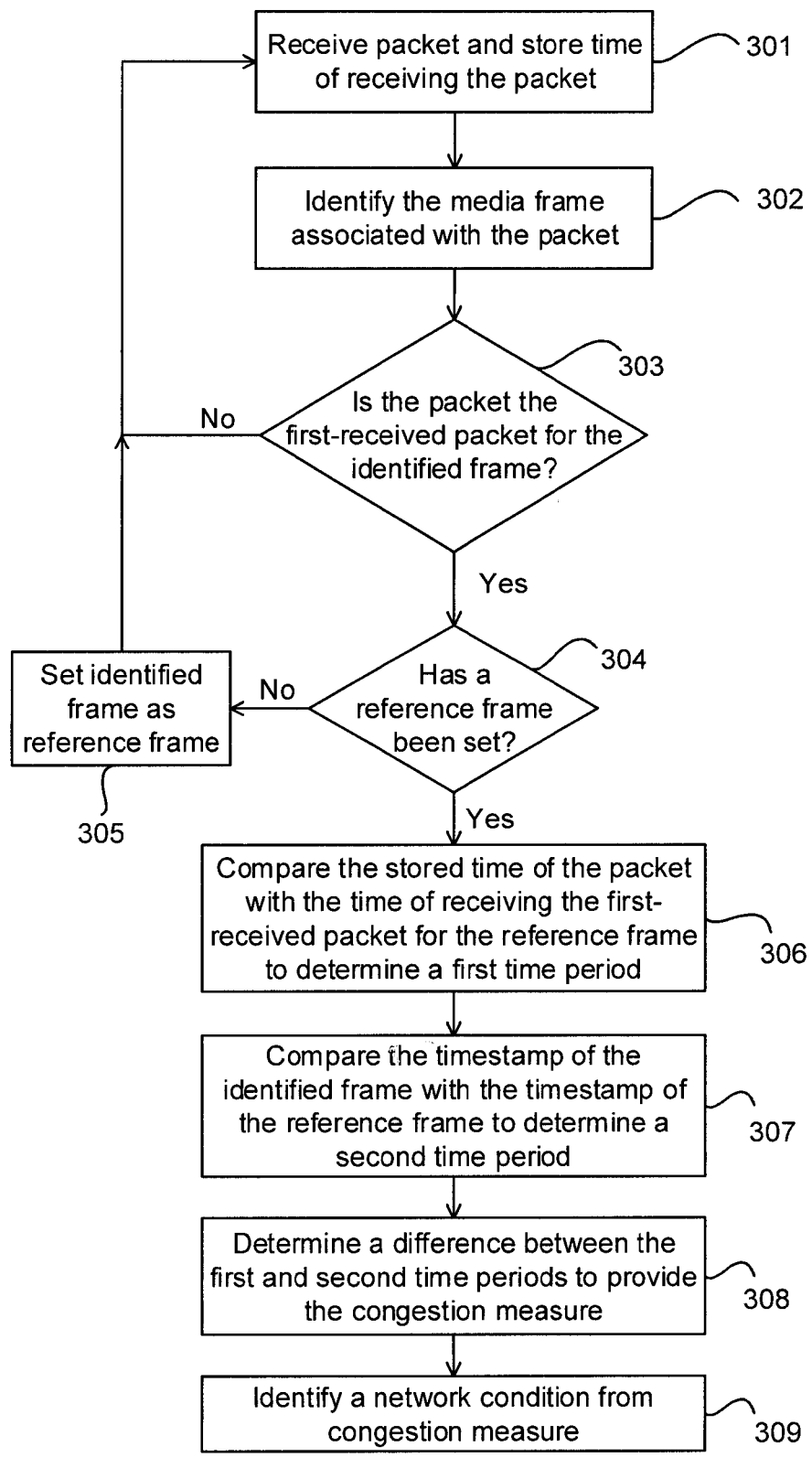
FIG. 3 depicts a process for identifying network conditions.

FIG. 3 is a flow diagram illustrating how network conditions between the transmitting and receiving devices 10 and 20 may be identified.

At step 301, a packet is received and the time that the packet is received is stored. As mentioned above, the time for receiving the packet may be determined from an internal clock of the receiving device.

At step 302, the media frame associated with the packet is determined. As mentioned above, the media frame associated with a packet may be identified in the header of the packet.

At step 303, it is determined if the packet is the first-received packet for the identified frame. If the packet is the first-received packet for that frame (i.e. no other packets associated with that frame have been received previously), then the process moves on to step 304. If the packet is not the first-received packet for that frame (i.e. the packet is associated with a frame for which another packet has previously been received), then the process loops back to step 301.

At step 304, it is determined if a reference frame has been previously set. If not, then the frame associated with received packet is set to be the reference frame at step 305, where the time for receiving that packet (at 301) is stored along with the timestamp associated with the identified frame. The process then loops back to step 301. If a reference frame had been set previously, then the process moves on to step 306.

At step 306, the time that the packet was received (stored at step 301) and the time that the first-received packet for the reference frame was received is compared to determine a first time period. At step 307, the timestamp of the frame associated with the received packet and the timestamp of the reference frame is compared to determine a second time period.

At step 308, a difference between the first time period (determined at step 306) and the second time period (determined at step 307) is determined to provide a congestion measure value.

At step 309, the congestion measure value is used to identify network conditions. As mentioned above, the congestion measure value determined for one frame or the values for a number of consecutive frames may be used to identify network conditions. For example, if a single congestion measure value is negative then this may indicate that the delay in the network has decreased (e.g. as described above with reference to FIG. 2d). As mentioned above, the reference frame may then be set to be the frame associated with the negative congestion measure. In another example, if the congestion measure increases over a consecutive number of frames, then this may indicate that the network is congested (as described above with reference to FIG. 2b). The identified condition may then be used to adapt transmission properties of the media stream (as mentioned above).

The process of FIG. 3 may be performed for every packet received as part of the same media stream (as indicated by the process looping back to step 301).

As mentioned above, the buffer 22 may be a jitter buffer. A jitter buffer absorbs delay variation in the network delivery of media packets. The jitter buffer works by holding media data for a period of time after it is received and before it is played out. Packets that arrive early are held in the jitter buffer longer. If packets are delayed excessively by the network, they may be discarded if they miss their playout time.

The jitter buffer can be considered to be a time window with the early edge aligned with the delay corresponding to the earliest arriving packet and the late edge representing the maximum permissible delay before a late arriving packet would be discarded. The delay applied to packets that arrive on time or at their expected arrival time is known as the nominal delay, and this is equivalent to the time difference/buffer size difference between the insertion point of the on-time packets and the point at which the packets are read out to be played. The jitter buffer 22 may be an adaptive jitter buffer. An adaptive jitter buffer can adapt to changes in the network's delay and has variable size or variable delay. The quality controller 25 can monitor the variation in the size of the adaptive jitter buffer 22 to determine the condition of the network 12.

The quality controller 25 contemporaneously monitors the variation in the size of the adaptive jitter buffer 22 and a measure of delay in receiving packets over the network 12.

Figure 4:
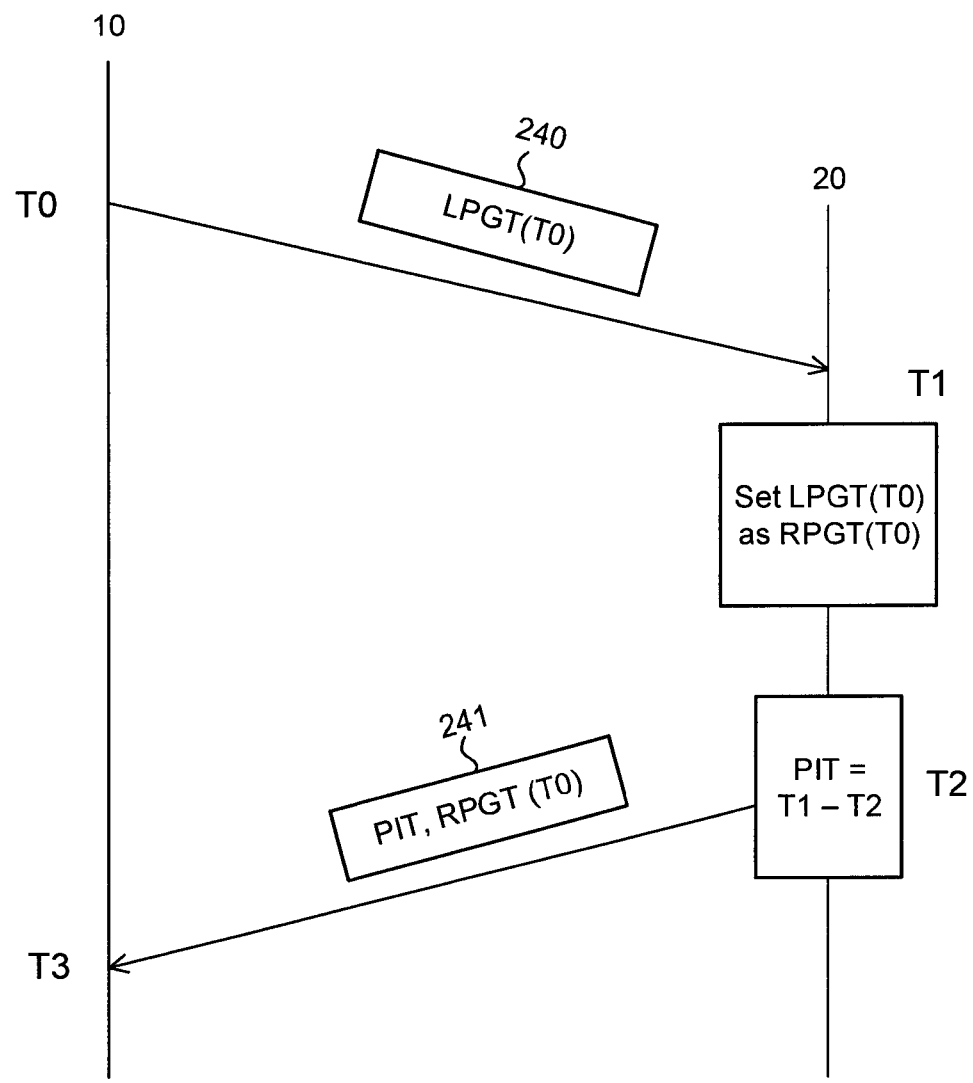
FIG. 4 depicts a process for estimating network delay.

In one example, the measure of delay may be determined from the time taken for packets to travel from the transmitting device 10 to the receiving device 20 and from the receiving device 20 to the transmitting device 10, as illustrated in FIG. 4.

Packets 240 and 241 may be packets for communicating media or other data (such as network statistics) between the transmitting and receiving devices 10 and 20. The packets 240 and 241 may each have one or more of the following information contained within it: Local Packet Generation Time (LPGT) and/or Remote Packet Generation Time (RPGT) and/or Packet Idle Time (PIT).

When devices 10 and 20 are communicating, for example during a VoIP call, every packet transmitted for the call may incorporate the LPGT information, which for packet 240 is T0. When packet 240 is received at device 20, the time instant at reception (T1) is measured and when device 20 sends the next packet 241, the time elapsed between the time at reception of the last packet 240 and the time of transmission (T2) of the current packet 241 is incorporated into the packet 241 as the PIT (i.e. PIT=T2−T1 in the example shown in FIG. 4). The packet generation time at device 10 (i.e. T0) of the last received packet 240 is included in packet 241. Device 10 can then estimate the network delay for a round trip from the information in packet 241 as:

Network delay=packet 241 received time(T3)−RPGT (T0)−PIT(T2−T1)     (3)

Therefore, the network delay=(T1−T0)+(T3−T2), which is the time spent in transmission over the network for a round trip.

In another examples, the measure of delay in receiving packets over the network may be:
- measuring inter-arrival times between complete frames.
- measuring the time period between timestamps of frames or packets received over a fixed period (e.g. one second) and comparing the time period with the fixed period.
- measuring the spread between pairs of packets of varying sizes and estimate the available bandwidth as a function of the time spread between packets in a pair, and their size. Depending upon the available bandwidth, the packet pairs spread in time as they traverse the network elements.

In a preferred embodiment, the congestion measure mentioned above is used as the measure of delay in receiving packets over the network. The congestion measure is a measure of delay in a single direction (i.e. from transmitting device to receiving device) rather than a round-trip measure of delay and thus may provide a more instantaneous measure of network delay than the method described in relation to FIG. 4. Furthermore, advantageously, the congestion measure is insensitive to variations in packet loss, out-of-order packets, retransmission of packets and packet sizes, as mentioned above.

FIGS. 5*a*-5*d* illustrate various scenarios which show how the monitoring the jitter buffer size and a measure of network delay can be used to determine the condition of a network. In these examples, the congestion measure is used as the measure of delay. However, any other measure of delay could be used (such as the network delay calculated using equation 3).

Figure 5A:
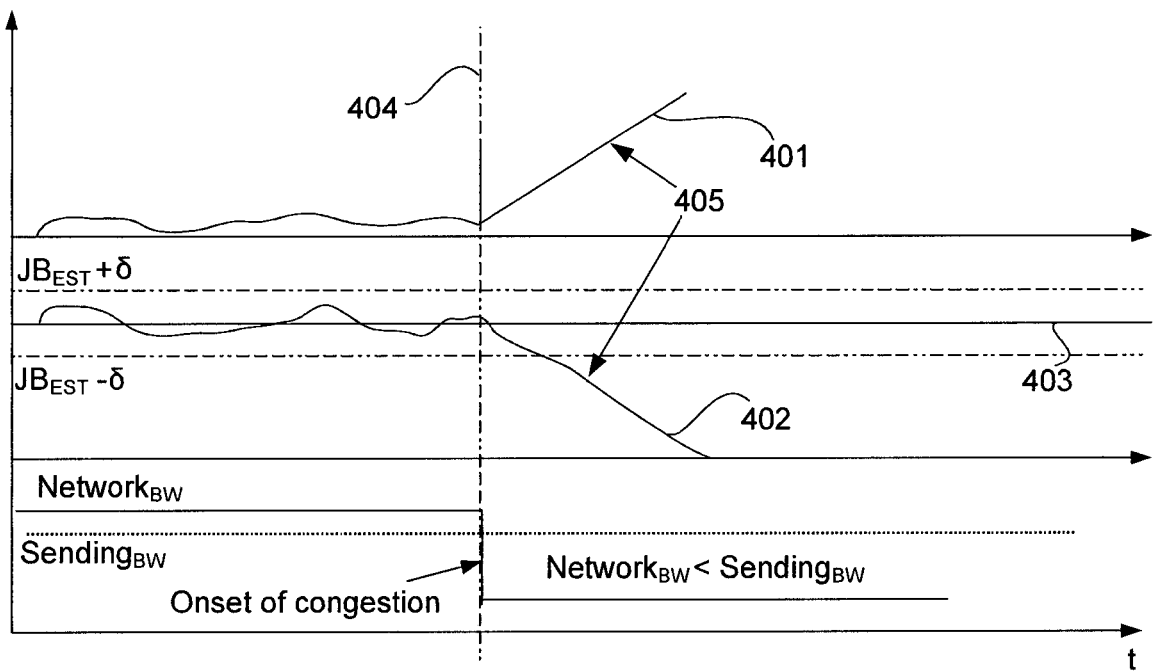
FIGS. 5a-5d illustrate variations in network delay and jitter buffer size for various network conditions.

FIG. 5*a* illustrates a scenario where the network 12 becomes congested. A first graph 401 which shows the variation in the congestion measure over a period of time and a second graph 402 which shows the variation in the adaptive jitter buffer size over the same period of time. Preferably, the average jitter buffer size is within a small tolerance of a target jitter buffer size ($JB_{EST}$) 403. The tolerance is ±δ, as shown in the diagram. For example, the tolerance may be ±10 ms of the target jitter buffer size. At time 404, the network starts to become congested. This causes the congestion measure to increase (which indicates that the network delay is increasing) and the size of the adaptive jitter buffer to decrease. The size of the jitter buffer decreases to below the tolerance level, −δ, and towards zero. This indicates that frames are being received at a rate that is slower than the rate at which they should be played out (and thus at a rate that is slower than they are transmitted). This in turn indicates that the network is congested. A further indicator that the network is congested is that the gradient of the decrease in the jitter buffer size is proportional to the gradient of the increase in the congestion measure (as depicted at 405).

Figure 5B:
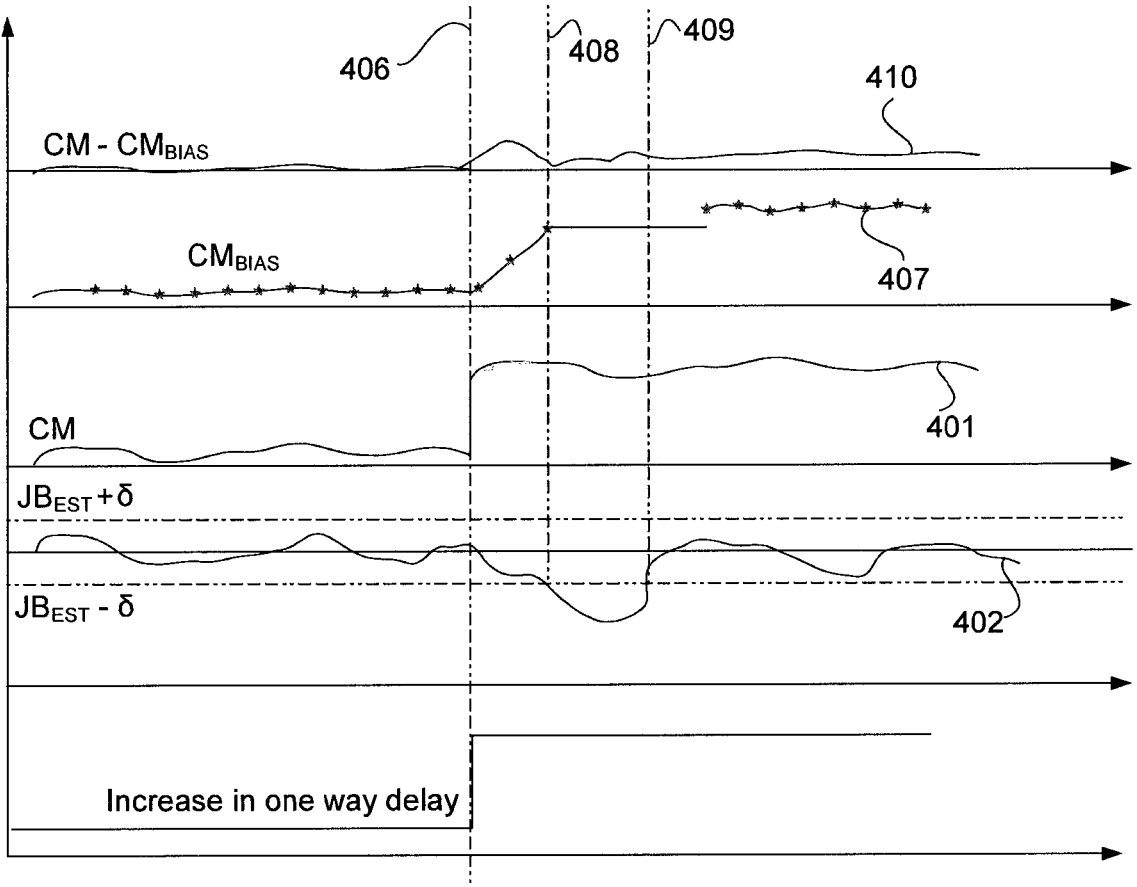

FIG. 5*b* illustrates a scenario where there is a one way increase in network delay. At time 406, there is an increase in the network delay. This may be caused by, for example, a change in the network route between the transmitting and receiving devices 10 and 20. At time 406, the congestion measure 401 increases and the jitter buffer size 402 begins to decrease. Eventually, the jitter buffer size 402 decreases to below the tolerance level, −δ. However, unlike the congestion condition, as the measure of delay does not increase (i.e. remains substantially constant after time 406), the jitter buffer size begins to increase again to be within the tolerance level. This is because the network delay causes a temporary decrease in the amount of packets in the jitter buffer, but as the network is not congested the packets arrive at the same rate as they did previously and so the buffer begins to fill again. Thus, this indicates that there is a one way increase in network delay rather than congestion.

The increase in network delay causes the congestion measure 401 to increase. The congestion measure remains constant for packets received after the increase in delay (as described with reference to FIG. 2*c*). This constant bias added to the congestion measure 401 may provide false readings to other components that use the congestion measure 401. For example, as mentioned above, the congestion measure may be used by the transmitting device to adapt its transmission bandwidth. The constant bias above zero may cause the transmitting device to, for example, incorrectly adapt its bandwidth. Thus, it may be advantageous to quickly remove the bias from the congestion measure. Preferably, the bias is determined by averaging two or more of the latest congestion measure values (e.g. the last three congestion measure values). The stars 407 in FIG. 5b depict the calculated bias based on averaging the last three congestion measure values. Preferably, the bias value is only updated when the condition of the network is stable. The jitter buffer size being within the tolerance level may indicate that the network is stable. Thus, preferably, the bias value is not updated from just prior to the jitter buffer size dropping to below the tolerance level (at time 408) to just after the jitter buffer size returning to within the tolerance level (at time 409). The bias may then be removed from the congestion measure value to provide an adjusted congestion measure value 410, which may then be used by other components (e.g. the quality controller 15 at the transmitting device 10), as mentioned above.

Figure 5C:
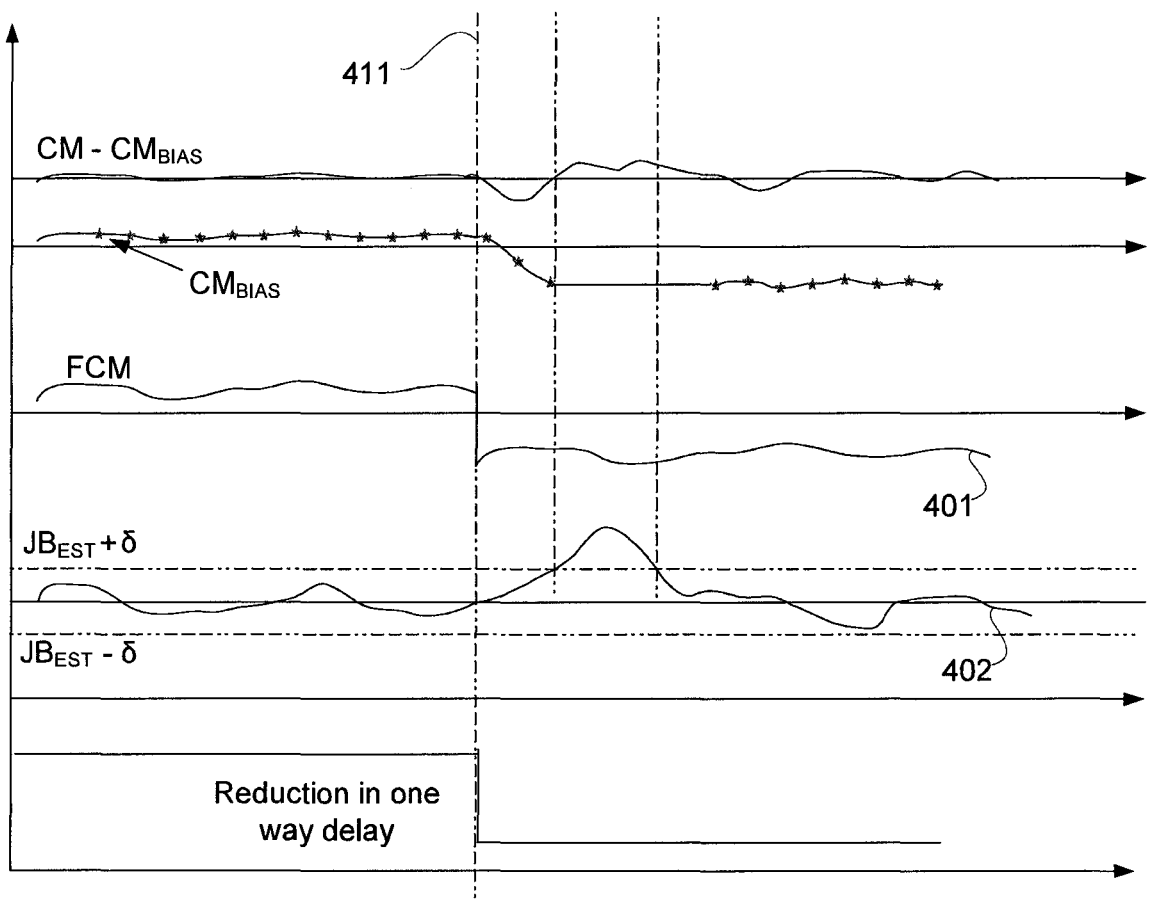

FIG. 5c illustrates a scenario where there is a one way decrease in network delay. At time 411, there is a decrease in the network delay. This may be caused by, for example, a change in the network route between the transmitting and receiving devices 10 and 20. At time 411, the congestion measure 401 decreases and the jitter buffer size 402 begins to increase. Eventually, the jitter buffer size 402 increases to above the tolerance level, +δ. As the network delay is constant, the jitter buffer size 402 begins to decrease again to be within the tolerance level. This is because the decrease in network delay causes a temporary increase in the amount of packets arriving at the jitter buffer. As the network is not congested the packets then start to arrive at the same rate as they previously did and so the buffer begins to empty again and remain within the tolerance level. Thus, this indicates that there is a one way decrease in network delay. FIG. 5c illustrates the behaviour of the congestion measure when there is a decrease in network delay. Preferably, when a decrease in network delay is detected, the reference frame is updated to be the latest frame, as mentioned above. Thus subsequent to any update, the congestion measure may then become positive until another decrease in network delay is detected.

Figure 5D:
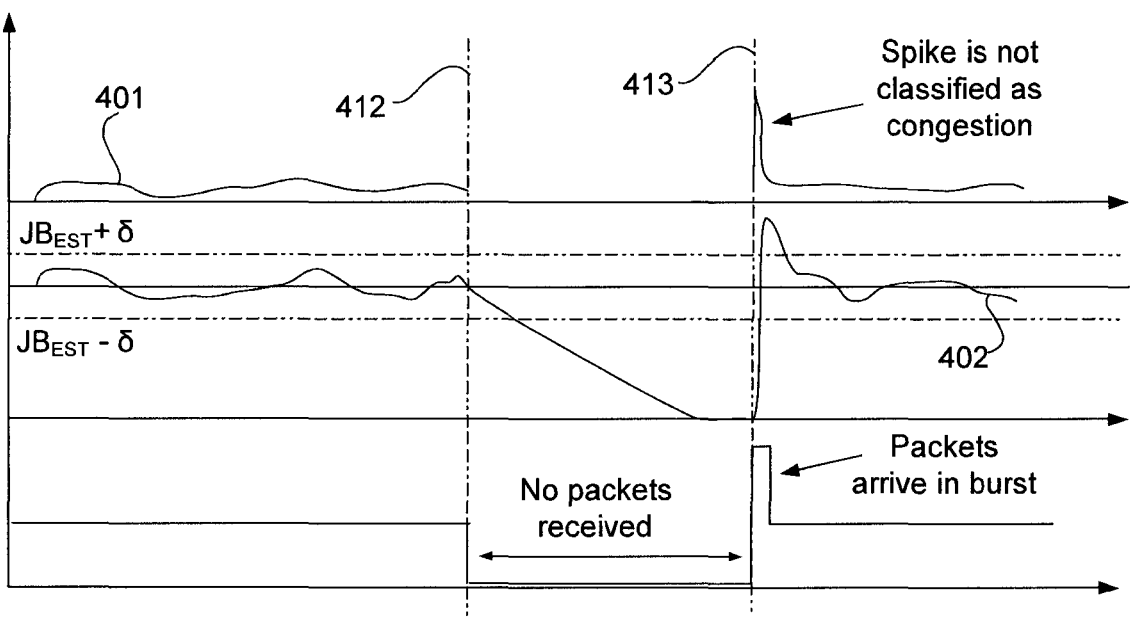

FIG. 5d illustrates a scenario where the network is bursty. Due to the burstiness, there are no packets received at time 412. This causes the jitter buffer size 402 to decrease and eventually drop to below the tolerance level, −δ. Then, at time 413, a burst of packets arrive. This causes the congestion measure 401 to spike and the jitter buffer size 402 to suddenly increase above the tolerance level +δ. The burst then ends and the packets begin to arrive at the rate prior to time 412, which causes the jitter buffer size 402 to return to be within the tolerance level. The rapid decrease and increase below and above the tolerance levels of the jitter buffer indicates that the network is bursty and so the spike in the congestion measure does not indicate that the network is congested.

As mentioned above, the quality controller 25 of the receiving device 20 contemporaneously monitors the size of the jitter buffer 22 and the network delay (which may be indicated by the congestion measure) to determine the condition of the network, as described by the scenarios above. The quality controller 25 may then transmit information indicative of the condition of the network to the transmitting device 10. Alternatively or additionally, the quality controller 25 may send the information indicating the jitter buffer size and the network delay (e.g. the congestion measure and/or the CurrentFrameRx and RefFrameRx values and/or the CurrentFrameTS and RefFrameTS values) to the transmitting device 10 so that the quality controller 15 of the transmitting device 10 itself can determine the condition of the network 12. The transmitting device 10 may then adjust its media transmission in dependence on the received information. For example, if it is determined that the network is congested, the transmitting device, in response, may reduce its transmission bandwidth. This may be achieved by, for example, reducing the quality of the media that is to be transmitted, increasing packet size (which reduces the packetisation overhead), reducing error correction redundancy, etc. Preferably, the transmission bandwidth will be reduced to be lower than the congested network bandwidth so that further congestion can be avoided. This will ensure that transmitted media packets arrive at the receiving device in a timely manner for playback. The quality controller 25 at the receiving device 20 may also adjust some reception parameters in response to determining the condition of the network. For example, if it is determined that the network is bursty, the receiving device may increase it's target jitter buffer size to help ensure that the media is played out without any gaps.

Figure 6:
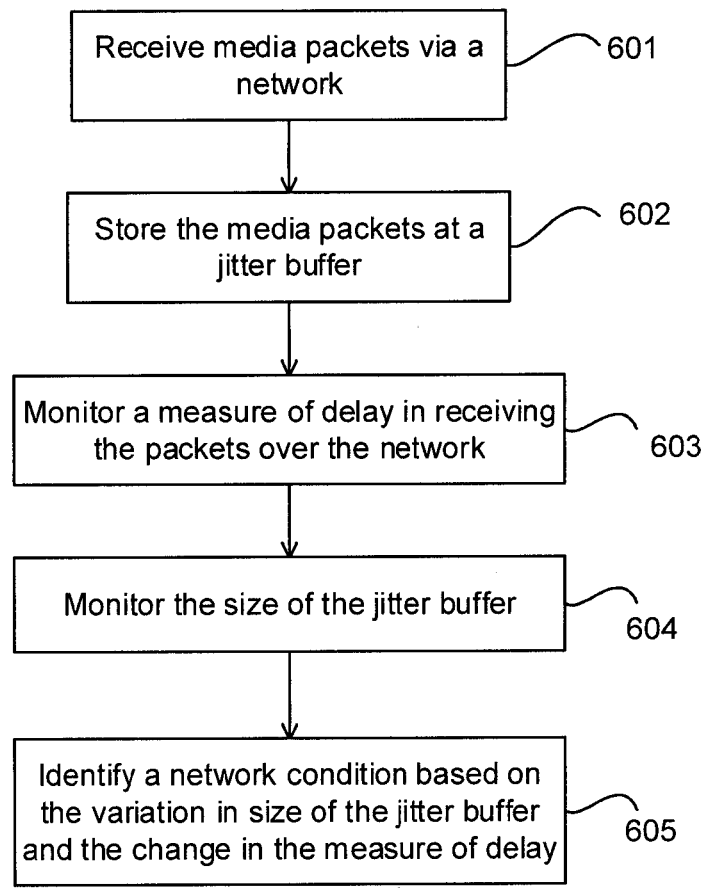
FIG. 6 depicts a process for identifying network conditions by monitoring the jitter buffer size.

FIG. 6 is a flow diagram illustrating how network conditions between the transmitting and receiving devices 10 and 20 may be identified from monitoring the size of the jitter buffer.

At step 601, media packets are received at the receiving device 20. At step 602, the media packets are temporarily stored at the jitter buffer 22.

At step 603, a measure of delay in receiving the packets over the network 12 is monitored. As mentioned above the measure of delay may be the congestion measure (as described in relation to FIGS. 2a-3) or the network delay (as described in relation to FIG. 4) or any other suitable measure of delay (such as the other examples mentioned above).

At step 604, the size of the jitter buffer 22 is monitored. The measure of delay and the size of the jitter buffer 22 may be monitored concurrently. At step 605, the variation in the size of the jitter buffer 22 and the change in the measure of delay with time is analysed so as to identify network conditions, such as those described in relation to FIGS. 5a-5d. The process of FIG. 6 may be performed periodically such that the condition of the network can be monitored for the duration of the media stream. When there is a change in the condition of the network, the transmission of the media stream may be adapted to optimise the stream for the new network condition.

The transmitting and receiving devices configured in accordance with the examples described herein could be embodied in hardware, software or any suitable combination of hardware and software. The transmitting devices may have the same capabilities as the receiving devices and vice versa. The devices as described herein could comprise, for example, software for execution at one or more processors (such as at a CPU and/or GPU), and/or one or more dedicated processors (such as ASICs), and/or one or more programmable processors (such as FPGAs) suitably programmed so as to provide functionalities of the devices, and/or heterogeneous processors comprising one or more dedicated, programmable and general purpose processing functionalities. The devices described herein can comprise one or more processors and one or more memories having program code stored thereon, the processors and the memories being such as to, in combination, provide the claimed devices and/or perform the claimed methods.

Data processing units described herein (e.g. encoder, quality controller and packetizer) need not be provided as discrete units and represent functionalities that could (a) be combined in any manner, and (b) themselves comprise one or more data processing entities. Data processing units could be provided by any suitable hardware or software functionalities, or combinations of hardware and software functionalities.

The term software as used herein includes executable code for processors (e.g. CPUs and/or GPUs), firmware, bytecode, programming language code such as C or OpenCL, and modules for reconfigurable logic devices such as FPGAs. Machine-readable code includes software and code for defining hardware, such as register transfer level (RTL) code as might be generated in Verilog or VHDL.

Any one or more of the methods described herein could be performed by one or more physical processing units executing program code that causes the unit(s) to perform the methods. The or each physical processing unit could be any suitable processor, such as a CPU or GPU (or a core thereof), or fixed function or programmable hardware. The program code could be stored in non-transitory form at a machine readable medium such as an integrated circuit memory, or optical or magnetic storage. A machine readable medium might comprise several memories, such as on-chip memories, computer working memories, and non-volatile storage devices.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method of identifying a network condition between a receiving device and a transmitting device, wherein the receiving device comprises a jitter buffer for storing packets received from the transmitting device via a network, the method comprising:
    monitoring a measure of delay in receiving media packets over the network;
    monitoring a size of the jitter buffer; and
    identifying a network condition in dependence on a change in the measure of delay and a variation in the size of the jitter buffer, comprising identifying an increase in network delay in response to determining that:
    (i) the change in the measure of delay indicates an increase in network delay and subsequently remains substantially constant; and
    (ii) the size of the jitter buffer decreases below a threshold size and subsequently increases above the threshold size while the measure of delay remains substantially constant.

2. The method as claimed in claim 1, wherein the identifying step comprises identifying congestion in the network if the change in the measure of delay indicates an increase in network delay and the size of the jitter buffer decreases below a threshold size.

3. The method as claimed in claim 1, wherein the identifying step comprises identifying a change in a network route between the pair of network devices in dependence on a variation in the size of the jitter buffer about a threshold size.

4. The method as claimed in claim 1, wherein the step of monitoring a measure of delay comprises:
    determining a first time period between receiving a first-received packet for an initial media frame and receiving a first-received packet for a subsequent media frame, wherein each received packet comprises a timestamp;
    determining a second time period between the timestamp of the packet for the initial media frame and the timestamp of the packet for the subsequent media frame; and
    forming the measure of delay in dependence on the difference between the first and second time periods.

5. The method as claimed in claim 1, wherein the step of monitoring a measure of delay comprises:
    determining a first time period between receiving an initial media frame and receiving a subsequent media frame, wherein each received frame comprises a timestamp;
    determining a second time period between the timestamp of the initial media frame and the timestamp of the subsequent media frame; and
    forming the measure of delay in dependence on the difference between the first and second time periods.

6. The method as claimed in claim 1, further comprising:
    adjusting the measure of delay in dependence on the size of the jitter buffer;
    at a first one of the network devices, sending an indication of said adjusted measure to the other network device; and
    at said other network device, receiving said indication and adjusting a bandwidth for transmission of media to said first network device in dependence on said indication.

7. The method as claimed in claim 1, further comprising:
    at a first one of the network devices, sending an indication of said identified network condition to the other network device; and
    at said other network device, receiving said indication and adjusting a bandwidth for transmission of media to said first network device in dependence on said indication.

8. The method as claimed in claim 1, further comprising:
    at a first one of the network devices, sending an indication of the measure of network delay and the size of the jitter buffer to the other network device; and
    at said other network device, receiving said indication and adjusting a bandwidth for transmission of media to said first network device in dependence on said indication.

9. The method as claimed in claim 1, wherein the packets are Real-time Transport Protocol (RTP) packets.

10. The method as claimed in claim 9, wherein the measure of delay is determined in dependence on RTP timestamps.

11. A data processing device for receiving a stream of media packets via a network, the device comprising:
    a transceiver configured to receive media packets from another device via the network;
    a jitter buffer configured to store the received packets; and
    a controller configured to:
        monitor a measure of delay in receiving the media packets over the network;
        monitor a size of the jitter buffer; and identify a network condition in dependence on a change in the measure of delay and a variation in the size of the jitter buffer;

wherein the controller is configured to identify an increase in network delay when:
(i) the change in the measure of delay indicates an increase in network delay and subsequently remains substantially constant; and
(ii) the size of the jitter buffer decreases below a threshold size and subsequently increases above the threshold size whilst the measure of delay remains substantially constant.

12. The device as claimed in claim 11, wherein the controller is further configured to identify congestion in the network if the change in the measure of delay indicates an increase in network delay and the size of the jitter buffer decreases below a threshold size.

13. The device as claimed in claim 11, wherein controller is further configured to identify a change in a network route between the data processing device and said another device in dependence on a variation in the size of the jitter buffer about a threshold size.

14. The device as claimed in claim 11, wherein the controller is further configured to:
determine a first time period between receiving a first-received packet for an initial media frame and receiving a first-received packet for a subsequent media frame, wherein each received packet comprises a timestamp;
determine a second time period between the timestamp of the packet for the initial media frame and the timestamp of the packet for the subsequent media frame; and
form the measure of delay in dependence on the difference between the first and second time periods.

15. The device as claimed in claim 11, wherein:
the controller is further configured to adjust the measure of delay in dependence on the size of the jitter buffer; and
the transceiver is further configured to send an indication of said adjusted measure to said another device.

16. The device as claimed in claim 11, wherein the transceiver is configured to send an indication of said identified network condition to said another device.

17. The device as claimed in claim 11, wherein the transceiver is configured to send an indication of the measure of network delay and the size of the jitter buffer to said another device.

18. A machine readable non-transitory storage medium having encoded thereon machine readable code for implementing a method of identifying a network condition between a receiving device and a transmitting device, wherein the receiving device comprises a jitter buffer for storing packets received from the transmitting device via a network, the method comprising:
monitoring a measure of delay in receiving media packets over the network;
monitoring a size of the jitter buffer; and
identifying a network condition in dependence on a change in the measure of delay and a variation in the size of the jitter buffer, comprising identifying an increase in network delay in response to determining that:
(i) the change in the measure of delay indicates an increase in network delay and subsequently remains substantially constant; and
(ii) the size of the jitter buffer decreases below a threshold size and subsequently increases above the threshold size while the measure of delay remains substantially constant.

* * * * *